United States Patent
He et al.

(10) Patent No.: US 9,119,085 B2
(45) Date of Patent: Aug. 25, 2015

(54) METHOD AND SERVER FOR COLLECTING RADIO FINGERPRINT POSITIONING DATA

(75) Inventors: Bin He, Shanghai (CN); Zhongqiu Lin, Shanghai (CN); Liang Shi, Shanghai (CN); Aron Yu, Shanghai (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/114,734

(22) PCT Filed: May 4, 2011

(86) PCT No.: PCT/CN2011/000781
§ 371 (c)(1),
(2), (4) Date: Oct. 29, 2013

(87) PCT Pub. No.: WO2012/149663
PCT Pub. Date: Nov. 8, 2012

(65) Prior Publication Data
US 2014/0073354 A1    Mar. 13, 2014

(51) Int. Cl.
  *H04W 24/02*    (2009.01)
  *H04W 64/00*    (2009.01)
  *G01S 5/02*     (2010.01)

(52) U.S. Cl.
  CPC .............. *H04W 24/02* (2013.01); *G01S 5/021* (2013.01); *G01S 5/0252* (2013.01); *H04W 64/00* (2013.01)

(58) Field of Classification Search
None
See application file for complete search history.

(56) References Cited

U.S. PATENT DOCUMENTS

| | | | | |
|---|---|---|---|---|
| 6,167,266 | A  * | 12/2000 | Havinis et al. | 455/433 |
| 2002/0068553 | A1* | 6/2002 | Shimizu | 455/418 |
| 2010/0087198 | A1* | 4/2010 | Wigren | 455/446 |
| 2011/0177832 | A1* | 7/2011 | Huang | 455/457 |

(Continued)

FOREIGN PATENT DOCUMENTS

| | | | |
|---|---|---|---|
| CN | 101048962 A | | 10/2007 |
| CN | 101547506 A | | 9/2009 |
| JP | 2010169554 A | * | 8/2010 |

(Continued)

OTHER PUBLICATIONS

International Search Report, Application No. PCT/CN2011/000781, Feb. 9, 2012, 12 pages.

(Continued)

*Primary Examiner* — Kimberly A Williams
(74) *Attorney, Agent, or Firm* — Nicholson De Vos Webster & Elliott LLP

(57) ABSTRACT

The present invention relates to a method and a positioning server in a radio access network for collecting radio fingerprint positioning data records from different nodes. The data records comprise geographical positions and radio network communication parameters and are stored and grouped in clusters in the positioning server. A geometrical shape representing a geographical area based on the network communication parameters in the collected positioning data records in the cluster is computed. When a notification about changed network configuration parameters for a radio cell is received, known positioning servers simply erase all positioning data records related to that radio cell. This results in the unavailability of still valid positioning data. The present invention overcomes this problem by selectively erase positioning data records in the positioning server only when the configuration parameters have changed beyond a predefined value range.

20 Claims, 5 Drawing Sheets

(56) References Cited

U.S. PATENT DOCUMENTS

2011/0306356 A1* 12/2011 Aoyama et al. ............ 455/456.1
2013/0331109 A1* 12/2013 Dhillon et al. ................ 455/446

FOREIGN PATENT DOCUMENTS

WO    WO-2007/086784  A1    8/2007
WO    WO-2009/134174  A1    5/2009
WO    WO-2010/069613  A1    6/2010

OTHER PUBLICATIONS

"3rd Generation Partnership Project; Technical Specification Group GSM/EDGE Radio Access Network; Location Services (LCS); Base Station System Application Part LCS Extension (BSSAP-LE) (Release 9)", 3GPP TS 49.031 V9.0.0 (Dec. 2009), 52 pages.

"3rd Generation Partnership Project; Technical Specification Group GSM/EDGE Radio Access Network; Location Services (LCS); Serving Mobile Location Centre—Base Station System (SMLC-BSS) interface; Layer 3 specification (Release 9)", 3GPP TS 48.071 V.9.0.0 (Dec. 2008), 22 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V1.0.0, (Mar. 2007), pp. 1-82.

* cited by examiner

METHOD AND SERVER FOR COLLECTING RADIO FINGERPRINT POSITIONING DATA

CROSS-REFERENCE TO RELATED APPLICATIONS

This application is a National stage of International Application No. PCT/CN2011/000781, filed May 4, 2011, which are hereby incorporated by reference.

TECHNICAL FIELD

The present invention relates to a method and a server for collecting radio fingerprint positioning data for a radio access network.

BACKGROUND

When an emergency call is made to an emergency center it is important to determine the location of the terminal from where the call was made. Authorities in many countries have therefore put positioning requirements on the telecommunication network operators. Traditional fixed line telephones are simply localized by their telephone numbers as these are affiliated with the physical address of the subscriber. For mobile terminals however other techniques are necessary. A method that has become a de facto standard in many countries is assisted GPS (A-GPS). A-GPS is based on traditional GPS positioning using GPS enabled mobile terminals. Although traditional GPS alone is a very precise positioning method it has its drawbacks in areas with poor GPS signal conditions as in buildings and dense urban areas. To improve the sensitivity and to speed up the time to fix the satellites in these situations A-GPS uses additional GPS data provided by the radio access network (RAN).

Another approach to positioning is called fingerprinting positioning, or RF fingerprinting. Fingerprinting positioning algorithms operate by creating a database of radio fingerprint data for each point of a fine coordinate grid that covers the RAN. The fingerprint data may include:

radio cell identities that are detected by the terminal, in each grid point quantized signal strength measurements, with respect to multiple base stations, performed by a mobile terminal, in each grid point radio connection information, such as the radio access bearer (RAB) etc.

Whenever a position request for a particular mobile terminal is received, fingerprint data for the mobile terminal is first obtained. This fingerprint data is matched with the fingerprint database to retrieve the corresponding grid point and thus identify the location of the mobile terminal. Of course, this approach requires that the fingerprint data for each grid point is unique and that the fingerprint data obtained from mobile terminal at a given point is relatively consistent.

The database of fingerprinted positions (the radio map) can be generated in several ways. One approach is to perform an extensive surveying operation that performs fingerprinting radio measurements repeatedly for all coordinate grid points of the RAN. The disadvantages of this approach include that the surveying required becomes substantial, even for small RANs. Further, some of the radio fingerprint data (e.g. signal strength and path loss) is sensitive to the orientation of the mobile terminal. For fine grids, the accuracies of the fingerprinted positions therefore become highly uncertain. Unfortunately, these potential problems are seldom reflected in the accuracy estimates reported along with the reported geographical result.

Another approach to RF fingerprinting is to replace the fine grid by high-precision position measurements of opportunity, and to provide fingerprinting radio measurements for said points. This avoids a number of the above drawbacks.

Ericsson's Adaptive Enhanced Cell ID (AECID) is a fingerprinting method that collects for example A-GPS positioning data. The principle of the AECID method is for example described in the international patent application with the publication number WO2009/131506 and in the paper "AECID Fingerprinting Positioning Performance" by Liang Shi and Torbjörn Wigren published in the IEEE Globecom 2009 proceedings.

An AECID positioning server collects high precision position measurements of opportunity in positioning data records also called reference points, using for example A-GPS. The positioning data records are for example collected from serving or gateway mobile location centres, SMLC/GMLC and comprise determined geographical positions associated with radio network communication parameters that are recorded during the high precision positioning measurement.

For GSM, the associated radio network communication parameters comprise the CGI of a serving cell and of neighbour cells and the corresponding signal strengths. Corresponding communication parameters are recorded for other radio technologies.

All collected positioning data records can be saved in an intermediate storage for later processing.

The AECID fingerprinting method continues by grouping the high precision position measurements in clusters. The high precision position measurements of each cluster are tagged with the same set of serving cell and detected neighbour cells, as well as network measurements. For each cluster that has enough high precision position measurements, a geometrical shape representing a geographical area is computed.

A problem arises when the RAN is reconfigured and network configuration parameters (such as cell identities, radio systems types, antenna height etc) change. At these occasions a number of collected positioning data records become invalid or misleading. When such configuration parameter changes are made, existing positioning servers erase all the collected positioning data records related to the changed configuration parameters and a large number of positioning data records has to be collected anew in order to compute new valid geometrical shapes. This is turn also means that positioning data that still was valid becomes unavailable.

SUMMARY

With this background, it is the object of the present invention to obviate at least some of the disadvantages mentioned above.

The object is achieved by a method that comprises the steps of collecting by a positioning server (such as an AECID server) from a least one node (such as a SMLC, GMLC, base station or a network management node) a plurality of positioning data records where each positioning data record comprises a determined geographical position and a set of determined radio network communication parameters including the identity of at least one radio cell and where the radio network communication parameters are associated with the determined geographical position. The collected positioning data records having the same set of radio network communication parameters are stored and grouped in a cluster.

When the cluster comprises a certain number of collected positioning data records, a geometrical shape representing a geographical area is computed based on the geographical position data in the collected positioning data records in the cluster.

When the positioning server receives a notification from another node (such as a network management node) that at least one configuration parameter for an identified radio cell has changed, positioning data records comprising the identified radio cell are erased from the cluster, only if the value of at least one selected configuration parameter has changed beyond a predefined value range. Optionally, the geometrical shape is recomputed based on the geographical position data in the remaining positioning data records in the cluster.

The object of the invention is further achieved by a positioning server (e g an AECID server) for collecting the radio fingerprint positioning data according to the method described above. The AECID server comprises one or several communication interfaces adapted to communicate with nodes such as SMLCs, GMLCs base stations and network management nodes. The positioning server further comprises
a positioning data record collector unit and
a shape computing unit.

The positioning data record collector unit is adapted to collect the positioning data records described above. The shape computing unit is adapted to compute the geometrical shape representing the geographical area for the collected positioning data records in the cluster.

The shape computing unit is also adapted to erase from the cluster, only those positioning data records comprising an identified radio cell if at least one selected configuration parameter related to that identified radio cell has changed beyond a predefined value range.

An advantage with the invention is that minor network configuration changes will have no impact on already collected positioning measurements and performed shape computation. This in turn results in an increased availability of valid fingerprints for positioning.

The invention will now be described in more detail and with preferred embodiments and referring to accompanying drawings.

DETAILED DESCRIPTION

Figure 1:
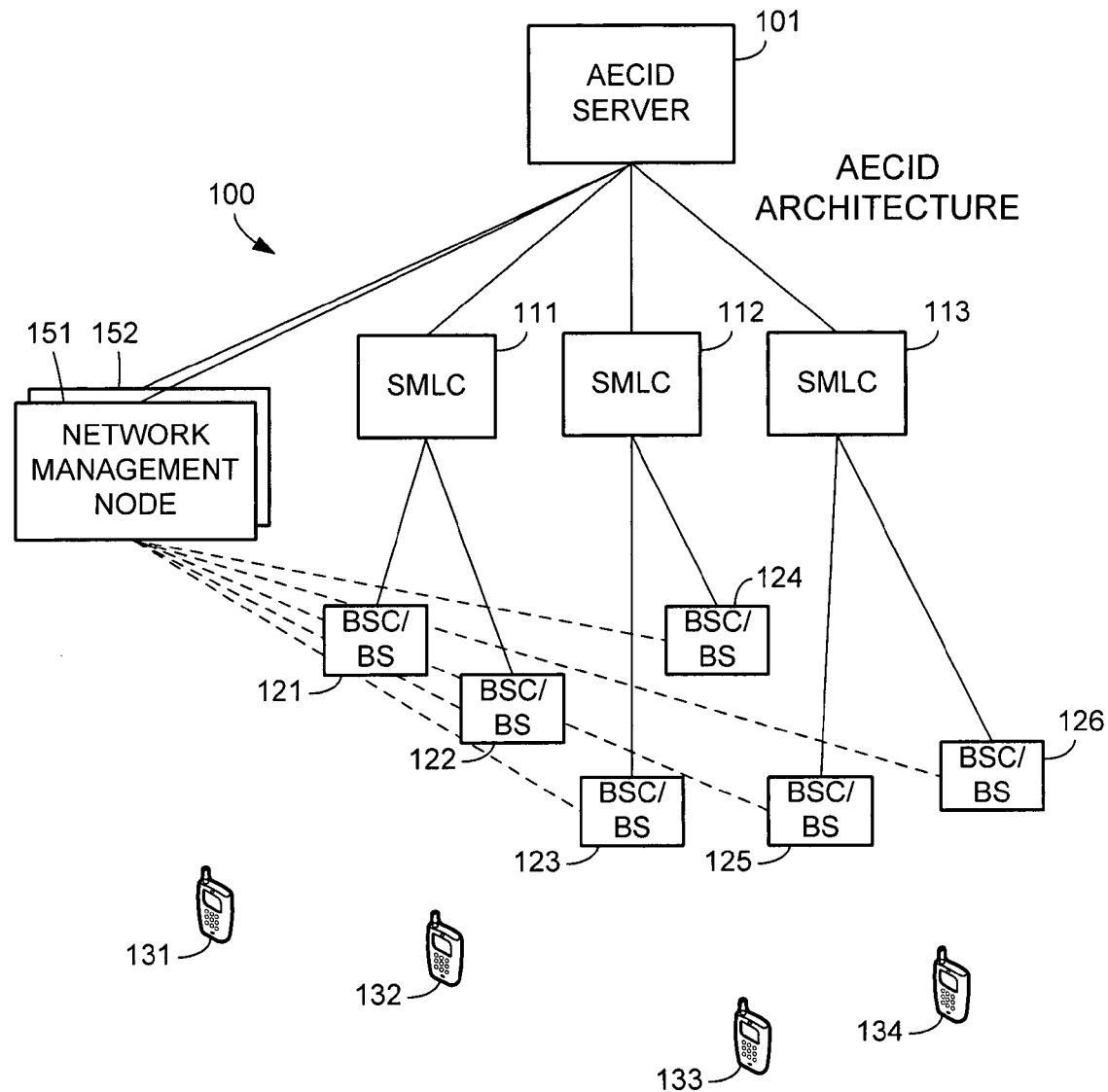
FIG. 1 is a block diagram illustrating an example of a fingerprinting positioning architecture.
Figure 5:
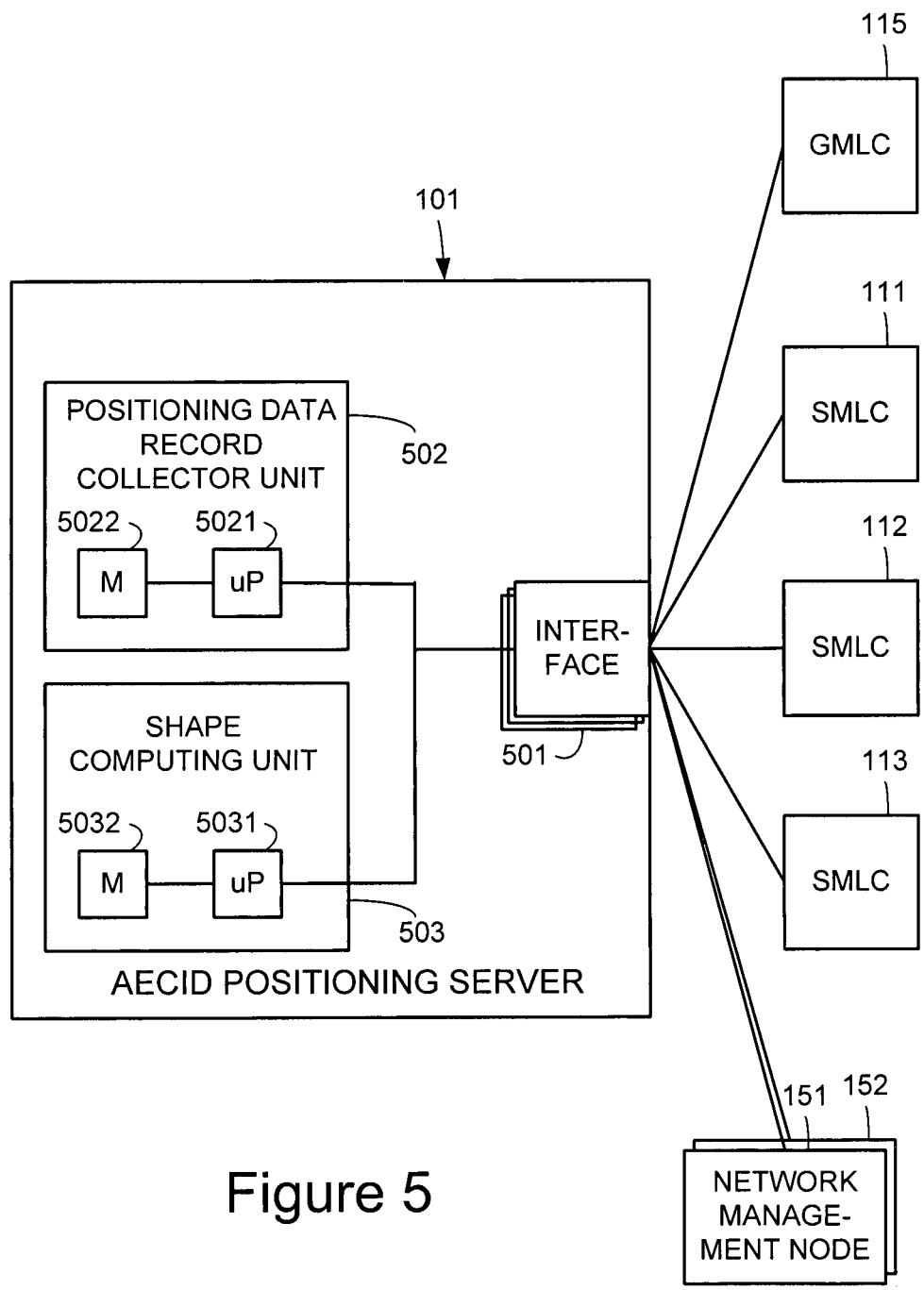
FIG. 5 is a block diagram illustrating a positioning server according to the present invention.

An example of an online Adaptive Enhanced Cell ID (AECID) fingerprinting architecture is illustrated by FIG. 1. The architecture comprises an AECID positioning server 101 and a plurality of service mobile location centers, SMLC 111-113 connected to the positioning server 101. Each SMLC 111-113 is connected to a plurality of base station controllers and/or base stations, BSC/BS 121-126 that are serving a plurality of mobile terminals 131-134. Each BSC/BS 121-126 is configured from a network management node 151,152. The network management node 151,152 is also connected to the AECID positioning server 101. The AECID position server 101 could also be connected to a GMLC 115 as shown in FIG. 5. The GMLC 115 is normally located in the core network and not in the RAN 100.

In the illustrated architecture there is a functional division between the positioning server 101 and the plurality of SMLCs 111-113. The SMLCs 111-113 implement the signaling flow associated with the collection of A-GPS measurements from the base stations BSC/BS 121-126. The SMLCs 111-113 create positioning data records (also called reference points) comprising a determined geographical position (using for example A-GPS) and a set of determined radio network parameters associated with the determined geographical position. The associated radio network communication parameters typically comprise the radio cell identity of a serving cell and of neighbour cells and the corresponding signal strengths and/or path loss parameters.

For example:
GSM Control Plane: CGI (Cell Global Identity) of serving cell, TA (Timing Advance), CGI of neighbour cell and corresponding Signal strength;
GSM User Plane: CGI of serving cell, TA, ARFCN (Absolute Radio Frequency Channel Number)/BSIC (Base Station Identity Code) of neighbour cell and corresponding Signal strength;
WCDMA Control Plane: Global UC_ID of serving cell, RTT (Round Trip Time), Global UC_ID of neighbour cell and corresponding path loss;
WCDMA User Plane: SAI (Service Area Identifier) of serving cell, Primary Scrambling Code of neighbour cell and corresponding path loss.

The SMLC is responsible for the GSM and WCDMA control plane communication parameters and the GMLC is responsible for the user plane communication parameters.

Figure 2:
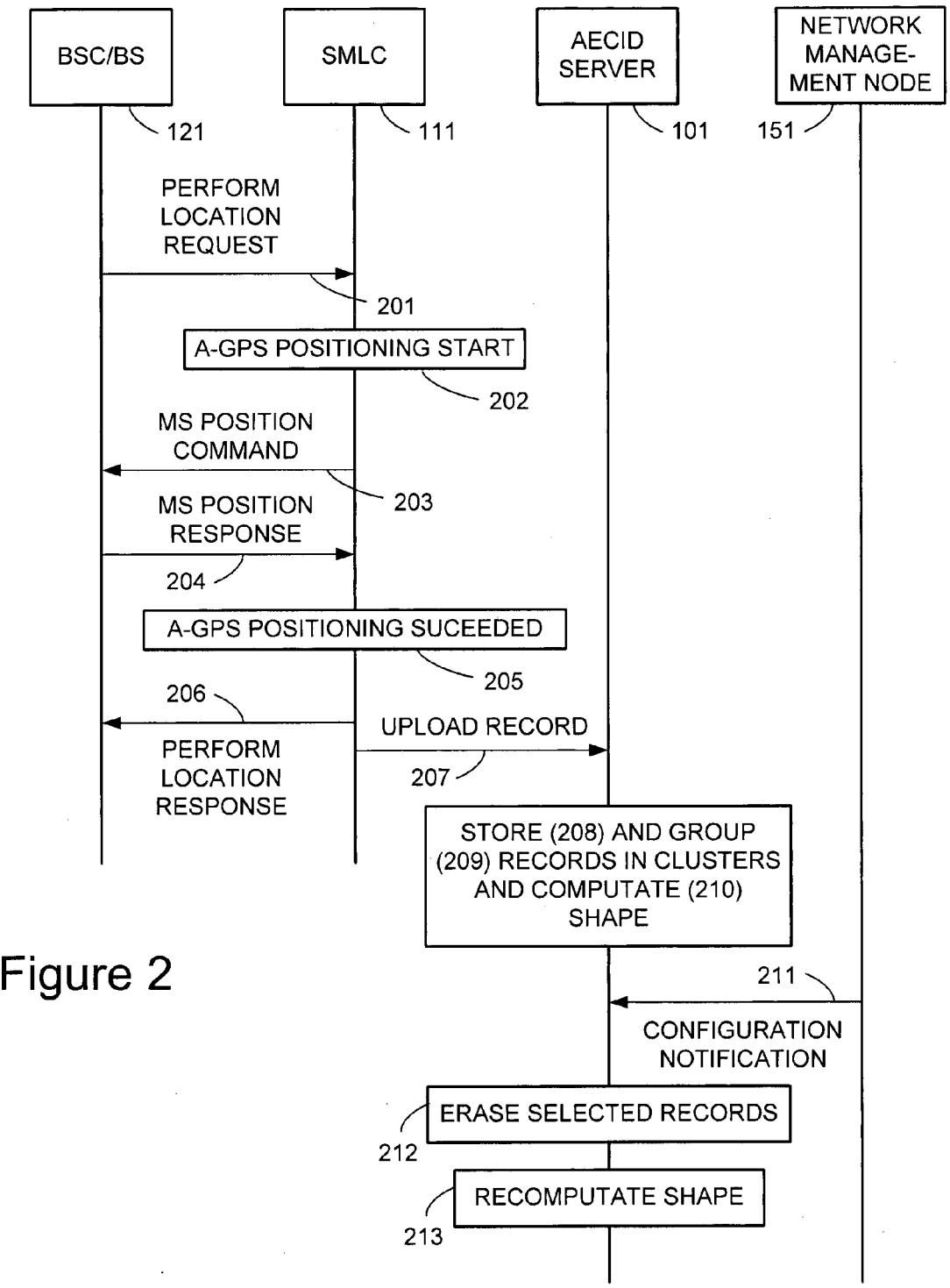
FIG. 2 is a flow chart or signaling diagram illustrating the method of collecting high precision position measurements of opportunity including the method of the present invention.

The collection of high precision position measurements of opportunity using A-GPS is illustrated by the signaling diagram in FIG. 2. A Perform Location Measurement Request message from the BSC/BS 121 is received by the SMLC 111 in step 201. The SMLC 111 starts an A-GPS positioning flow in step 202 by sending a MS Position Command message to the BSC/BS 121 in step 203. The position measurement data are received in a MS Position Response message in step 204. If enough positioning data is received and the location request is succeeded in step 205, the SMLC 111 sends a Perform Location Response to the BSC/BS 121 in step 206 and sends a positioning record with the determined geographical position and a set of determined radio network parameters associated with the determined geographical position in an Upload Record message to the AECID server 101 in step 207. The AECID server 101 stores the positioning data record in step 208 and groups the received data records in clusters in step 209. For each cluster that has enough collected high precision position measurements, a geometrical AECID shape is computed in step 210, where the shape represents a geographical area. The shape can be a polygon or an ellipse depending on the type of radio system (GSM, WCDMA etc). The shape can be sent back to the SMLC 111 and stored in an AECID shape cache.

Figure 3:
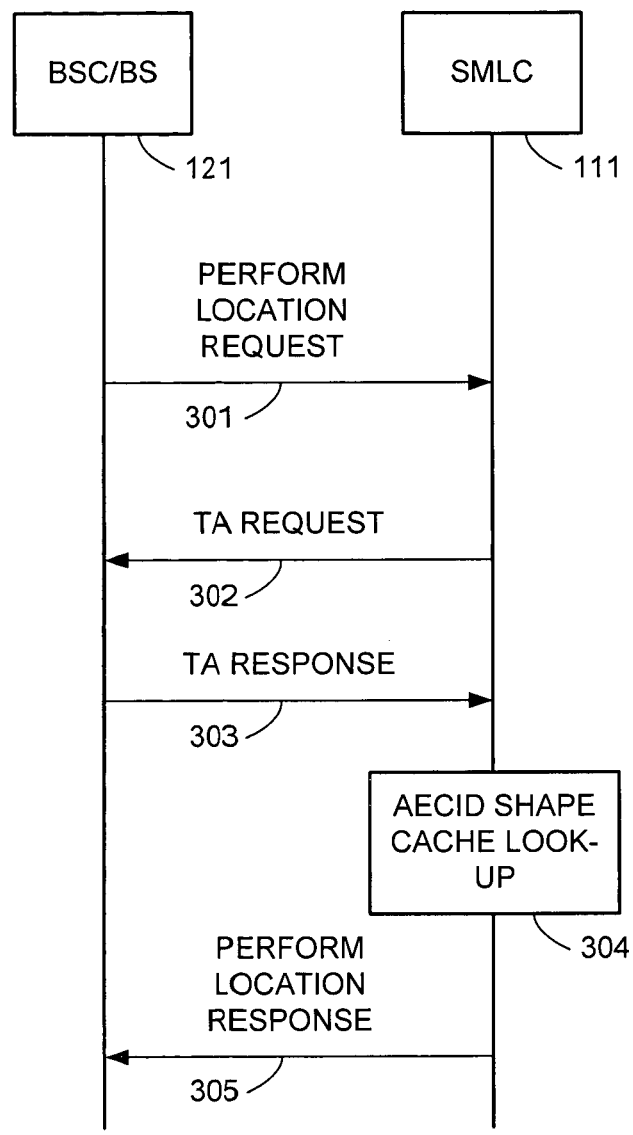
FIG. 3 is a flow chart or signaling diagram illustrating typical AECID positioning signaling flow.

The computed shape is used for positioning of individual mobile terminals 131-134 in the radio access network, RAN 100. An example of an information flow and the involved network elements is shown in the signaling diagram in FIG. 3. The SMLC 111 receives a Perform Location request message from the BSC/BS 121 in step 301. This message may in turn be trigged by a request from an emergency center requiring locating a mobile terminal 131. The SMLC 111 sends a TA request message back to the BSC/BS 121 in step 302 and receives in step 303 a TA response message with network parameters such as the cell identities of serving and neighbor cells and corresponding signal strength. The SMLC 111 performs a lookup in the AECID shape cache in step 304. The identified shape including the cell identities and the corresponding signal strength is returned to the BSC/BS in a perform location response message in step 305. More details on the information elements in each message discussed above are found in the 3GPP specifications TS 48.071 and TS 49.031.

Figure 4:
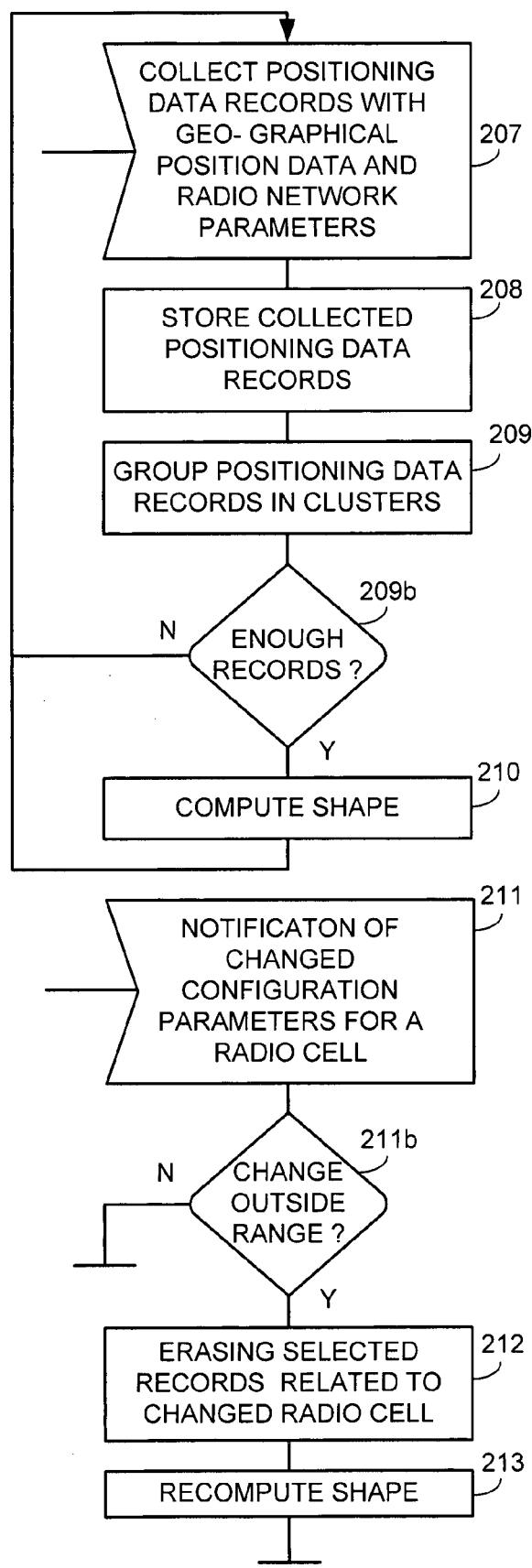
FIG. 4 is a flow chart illustrating the method of the present invention.

The steps 207 to 213 in FIG. 2 are more detailed in FIG. 4. As described above, the AECID server 101 receives in step 207 a positioning record with a determined geographical position and a set of determined radio network parameters associated with the determined geographical position. The AECID server 101 stores the positioning data record in step 208. Positioning data records having the same set of radio network parameters are grouped in a cluster in step 209. In step 209b a check is made if sufficient positioning data records have been collected. If this is the case, the geometrical shape is computed in step 210.

The process of collecting new positioning data records and computing geometrical shapes in the AECID server 101 can be an ongoing and repeated activity during the operation of the RAN.

In the event that the RAN 100 is re-configured at a network management node 151, a number of configuration parameters related to a radio cell may change. A notification of these changes is sent from the management node 151 to the AECID server 101 in step 211. The notification could for example comprise the export of a changed cell list, CCL which includes data about those radio cells whose configuration parameters have changed.

Instead of erasing all the collected positioning data records related to the changed configuration parameters as in existing RANs, the present invention selectively, after the decision step 211b, erase in step 212 from the cluster, only those positioning data records comprising the identified radio cell for which the value of a selected configuration parameter has changed beyond a predefined value range.

To achieve this, each one of the network configuration parameters for the RAN 100 is given a different 'sensibility' weight and/or ranges within they can change without impacting the positioning data records. For example, some low level sensibility configuration parameters may change without disturbing the collected positioning data at all such as naming information in network cell data like BSC name and cell name. Some selected medium level sensibility parameters may vary within a certain value range without disturbing the collected positioning data. Examples on that are radio system parameters such as minimum received signal level at the mobile terminal, antenna gain, antenna tilt, base station, BS power, cell direction, sector angle and TA limit. Other examples are geographic information parameters related to the location of the cell or radio equipment such as BSC/BS site latitude/longitude, cell latitude/longitude, altitude range within the cell coverage, maximum cell radius and antenna height.

Some selected high level sensibility parameters may always affect the collected positioning data if they are changed, for example identity parameters for the radio cell or for the mobile network such as MCC (Mobile Country Code) MNC (Mobile Network Code) LAC (Location Area Code) and CI (Cell Identity). Other parameters are some other major network parameters like antenna type (OMNI, Sector) radio system type (GSM800, GSM900, GSM1800 etc) and cell type (PICO, MICRO, MACRO) etc.

In short, if a selected configuration parameter related to an identified radio cell has changed beyond a predefined value range, only the positioning data records comprising the identified radio cell are erased from the cluster as in step 212 in FIG. 4.

The total set of configuration parameters for each radio cell can also be expressed as $$S=\{P^h, P^m, P^l\}$$

where S is a set including all the configuration parameters for certain cell.

$P^h$ is a set for high level sensibility configuration parameters:

$$P^h=\{P_1^h, P_2^h, \ldots, P_i^h\}$$

$P^m$ is a set for middle level sensibility configuration parameters:

$$P^m=\{P_1^m, P_2^m, \ldots, P_j^m\}$$

$P^l$ is a set for low level sensibility configuration parameters:

$$P^l=\{P_1^l, P_2^l, \ldots, P_k^l\}$$

and i+j+k=N, where N is the total number of configuration parameters for the radio cell.

In the set $P_m$, there are two subset $P^a$ and $P^r$, and $P^m=\{P^a, P^r\}$, $P^a$ includes the configuration parameters which use absolute value as threshold while $P^r$ includes the configuration parameters which use ratio as threshold.

p is the parameter, d(p) is the difference between new value and old value for configuration parameter p, r(p) is the ratio of new value and old value for configuration parameter p.

v(p) is the threshold for configuration parameter p.

The pseudo code for an embodiment of an implemented logic control can be as follows:

```
if p ∈ P^l, then
{
    Ignore the change.
}
else if p ∈ P^h, then
{
    delete the corresponding
    positioning data records that
    belongs to this radio cell.
}
else if p ∈ P^m, then
{
    if p ∈ P^a and d(p) < v(p), then
    {
        Ignore the change.
    }
    else
    {
        delete the corresponding
        positioning data records that
        belongs to this radio cell.
    }
    end
    If p ∈ P^r and r(p) < v(p), then
    {
        Ignore the change.
    }
    else
    {
        delete the corresponding
        positioning data records that
        belongs to this radio cell.
```

```
        }
      end
    }
  end
```

In the example above, S comprises three sets S={$P^h, P^m, P^l$}. S could very well comprise more than three sets, but three sets can be seen as a preferred embodiment.

Returning to FIG. 4, the geometrical shape is optionally recomputed in step 213 based on the geographical position data in the remaining positioning data records in the cluster. The recomputation can for example be performed each time a positioning data record is erased or when the number of positioning data records in the cluster falls below a predetermined threshold or at regular intervals.

The AECID positioning server 101 for collecting radio fingerprint positioning data according to the method described above is illustrated in FIG. 5 and comprises one or several communication interfaces 501 adapted to communicate with SMLC/GMLCs 111-113,115, base stations 121-126 (not shown) and with network management nodes 151, 152. The AECID server 101 further comprises
  a positioning data record collector unit 502 and
  a shape computing unit 503.

The positioning data record collector unit 502 is adapted to collect the positioning data records described above from the different nodes. The shape computing unit 503 is adapted to compute the geometrical shape representing the geographical area for the collected positioning data records in the cluster.

The shape computing unit 503 is also adapted to erase from the cluster, only those positioning data records comprising an identified radio cell if at least one selected configuration parameter related to that identified radio cell has changed beyond a predefined value range.

The positioning data record collector unit 502 and shape computing unit 503 could in one embodiment each comprise a micro processor uP 5021,5031 and a memory area M 5022, 5032 adapted to execute the collections and computations described above.

Although the architecture in FIG. 1 illustrates an online collection scenario where a functional division between the positioning server 101 and the SMLCs 111-113 is used, this division is not a necessity in the context of the present invention. In principle, the present invention is also operable if the functionality in the AECID positioning server 101 and the SMLCs 111-113 together is integrated in a single positioning server. The AECID positioning server 101 could also collect the positioning data records from other nodes such as network management nodes 151,152. In this case the position data records originate from offline collections using different positioning tools.

The invention claimed is:

1. A method in a positioning server for collecting radio fingerprint positioning data for a radio access network (RAN) comprising the steps of:
  collecting from a least one first node a plurality of positioning data records, wherein each positioning data record comprises a determined geographical position and a set of determined radio network communication parameters including the identity of at least one radio cell, and wherein the set of determined radio network communication parameters are associated with the determined geographical position;
  storing the collected positioning data records;
  grouping positioning data records having a same set of radio network parameters in a cluster;
  when the cluster comprises a certain number of collected positioning data records, computing a geometrical shape representing a geographical area based on geographical position data in the collected positioning data records in the cluster;
  receiving from a second node a notification that at least one of a plurality of configuration parameters for an identified radio cell has changed; and
  erasing from the cluster, positioning data records comprising the identified radio cell if a value of the at least one configuration parameter has changed beyond a predefined value range.

2. The method as in claim 1, wherein the first node is any of the following nodes:
  a serving mobile location centre (SMLC);
  a gateway mobile location centre (GMLC);
  a network management node;
  a base station controller or a base station BSC/BS;
  and wherein the second node is a network management node.

3. The method as in claim 2, wherein the set of determined radio network communication parameters comprises at least one of:
  identity parameters for a serving radio cell;
  identity parameters for neighbor radio cells; and
  signal strength and/or path loss parameters for each radio cell.

4. The method as in claim 3, wherein the configuration parameters comprise at least one of:
  identity parameters for each radio cell;
  identity parameters for the radio access network;
  radio system parameters including type of radio system, cell or antenna; and
  geographic location of the cell or radio equipment.

5. The method as in claim 1, wherein the geographical position is determined by using assisted GPS (A-GPS).

6. The method as in claim 1 further comprising: recomputing the geometrical shape each time a positioning data record is erased.

7. The method as in claim 1 further comprising: recomputing the geometrical shape when the number of positioning data records in the cluster falls below a predetermined threshold.

8. The method as in claim 1 further comprising: recomputing the geometrical shape at regular intervals.

9. The method as in claim 1, wherein the geometrical shape is a polygon.

10. The method as in claim 1, wherein all configuration parameters of the identified radio cell are included in a plurality of sets, and wherein the plurality of sets include a set for high level sensibility configuration parameters, a set for middle level sensibility configuration parameters, and a set for low level sensibility configuration parameters.

11. The method as in claim 10, wherein the erasing from the cluster the positioning data records comprises:
  determining that the at least one selected configuration parameter is in the set for middle level sensibility configuration parameters of the plurality of sets;
  determining that the value of the at least one selected configuration parameter has changed beyond the predefined value range;
  erasing the positioning data records comprising the identified radio cell.

12. The method of claim 10, further comprising:
   determining that the at least one selected configuration parameter is in the set for high level sensibility configuration parameters of the plurality of sets; and
   erasing the positioning data records comprising the identified radio cell.

13. The method of claim 10, further comprising:
   determining that the at least one selected configuration parameter is in the set for low level sensibility configuration parameters of the plurality of sets; and
   keeping the positioning data records comprising the identified radio cell.

14. A positioning server for collecting radio fingerprint positioning data for a radio access network (RAN) comprising:
   at least one communication interface adapted to communicate with a plurality of nodes;
   a positioning data record collector unit; and
   a shape computing unit,
   wherein the positioning data record collector unit is adapted to collect from at least one first node and to store in a cluster, positioning data records each data record comprising a determined geographical position and a set of determined radio network communication parameters including the identity of at least one radio cell, wherein the set of determined radio network communication parameters are associated with the determined geographical position, wherein the shape computing unit is adapted to compute a geometrical shape representing a geographical area for the collected positioning data records in the cluster, and wherein the shape computing unit is characterized in that it is further adapted to erase from the cluster, selected positioning data records comprising a specific radio cell if at least one selected configuration parameter for that radio cell received in a notification from a second node has changed beyond a predefined value range.

15. The positioning server as in claim 14, wherein the at least one first node is any or a combination of the following nodes:
   a serving mobile location centre (SMLC);
   a gateway mobile location centre (GMLC);
   a network management node;
   a base station controller or a base station BSC/BS;
   and wherein the second node is a network management node.

16. The positioning server as in claim 15, wherein the set of determined radio network communication parameters comprises at least one of:
   identity parameters for a serving radio cell;
   identity parameters for neighbor radio cells; and
   signal strength and/or path loss parameters for each radio cell.

17. The positioning server as in claim 16, wherein the configuration parameters comprise at least one of:
   identity parameters for each radio cell;
   identity parameters for the radio access network;
   radio system parameters including type of radio system, cell or antenna; and
   geographic location of the cell or radio equipment.

18. The positioning server as in claim 14, wherein the shape computing unit is further adapted to recompute the geometrical shape each time a positioning data record is erased.

19. The positioning server as in claim 14, wherein the shape computing unit is further adapted to recompute the geometrical shape when the number of positioning data records in the cluster falls below a predetermined threshold.

20. The positioning server as in claim 14, wherein the shape computing unit is further adapted to recompute the geometrical shape at regular intervals.

* * * * *